United States Patent
Okamoto et al.

(10) Patent No.: US 11,313,577 B2
(45) Date of Patent: Apr. 26, 2022

(54) AIR-CONDITIONING SYSTEM, MACHINE LEARNING APPARATUS, AND MACHINE LEARNING METHOD

(71) Applicant: DAIKIN INDUSTRIES, LTD., Osaka (JP)

(72) Inventors: Yasunori Okamoto, Osaka (JP); Naotoshi Fujita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/594,393

(22) PCT Filed: Apr. 17, 2020

(86) PCT No.: PCT/JP2020/016968
§ 371 (c)(1),
(2) Date: Oct. 14, 2021

(87) PCT Pub. No.: WO2020/218219
PCT Pub. Date: Oct. 29, 2020

(65) Prior Publication Data
US 2022/0099325 A1    Mar. 31, 2022

(30) Foreign Application Priority Data

Apr. 26, 2019  (JP) .............................. JP2019-086786
Apr. 17, 2020  (JP) .............................. JP2020-073804

(51) Int. Cl.
*F24F 11/64* (2018.01)
*F24F 11/46* (2018.01)
(Continued)

(52) U.S. Cl.
CPC .............. *F24F 11/64* (2018.01); *F24F 11/46* (2018.01); *G05B 19/042* (2013.01); *G06N 20/00* (2019.01);
(Continued)

(58) Field of Classification Search
CPC ........ F24F 11/64; F24F 11/46; F24F 2110/10; F24F 2110/12; F24F 2110/20;
(Continued)

(56) References Cited

U.S. PATENT DOCUMENTS 3,604,954 A * 9/1971 May ..................... H03K 3/2823
                                                            330/3
7,558,700 B2   7/2009 Yamashita et al.
(Continued)

FOREIGN PATENT DOCUMENTS

JP  H08-100940   4/1996
JP  2005-207644  8/2005
(Continued)

OTHER PUBLICATIONS

International Search Report dated Jul. 7, 2020, issued to PCT/JP2020/016968.
(Continued)

*Primary Examiner* — Ramesh B Patel
(74) *Attorney, Agent, or Firm* — IPUSA, PLLC

(57) ABSTRACT

An air-conditioning system includes an outside air conditioning device, an air conditioning device, and a machine learning apparatus, and includes a state variable acquiring unit configured to acquire state variables, a learning unit configured to perform learning by associating the state variables with at least either an operating capacity of the outside air conditioning device or an operating capacity of the air conditioning device, and a reward calculating unit configured to calculate a reward that correlates with a total of energy consumption of the outside air conditioning device and energy consumption of the air conditioning device. The learning unit performs the learning by using the reward calculated in a period determined in accordance with a time duration until the total of the energy consumption changes (Continued)

after at least either the operating capacity of the outside air conditioning device or the operating capacity of the air conditioning device has changed.

8 Claims, 9 Drawing Sheets

(51) Int. Cl.
*G06N 20/00* (2019.01)
*G05B 19/042* (2006.01)
*F24F 110/10* (2018.01)
*F24F 110/20* (2018.01)
*F24F 110/22* (2018.01)
*F24F 140/00* (2018.01)
*F24F 140/60* (2018.01)
*F24F 110/12* (2018.01)

(52) U.S. Cl.
CPC ....... *F24F 2110/10* (2018.01); *F24F 2110/12* (2018.01); *F24F 2110/20* (2018.01); *F24F 2110/22* (2018.01); *F24F 2140/00* (2018.01); *F24F 2140/60* (2018.01); *G05B 2219/2614* (2013.01)

(58) Field of Classification Search
CPC ............... F24F 2110/22; F24F 2140/00; F24F 2140/60; G05B 19/042; G05B 2219/2614; G06N 20/00
See application file for complete search history.

(56) References Cited

U.S. PATENT DOCUMENTS

| | | | |
|---|---|---|---|
| 9,677,780 B2* | 6/2017 | Nakagawa | F24F 11/0008 |
| 10,989,429 B2 | 4/2021 | Okamoto et al. | |
| 11,062,062 B2* | 7/2021 | Poux | G05B 23/0254 |
| 11,222,282 B2* | 1/2022 | Sugano | G06N 20/00 |
| 2013/0167571 A1* | 7/2013 | Nakagawa | F24F 11/46 236/44 A |
| 2019/0309970 A1* | 10/2019 | Park | G06N 3/04 |
| 2020/0080742 A1* | 3/2020 | Okamoto | G05B 15/02 |
| 2021/0190361 A1* | 6/2021 | Chae | F24F 1/0007 |
| 2021/0222905 A1* | 7/2021 | Morioka | F24F 3/1405 |
| 2021/0405727 A1* | 12/2021 | Singh | G05B 13/0265 |

FOREIGN PATENT DOCUMENTS

| | | |
|---|---|---|
| JP | 2010-139213 | 6/2010 |
| JP | 2012-077948 | 4/2012 |
| JP | 2016-211753 | 12/2016 |
| JP | 2018-048750 | 3/2018 |
| JP | 2018-173264 | 11/2018 |
| WO | 2012/049897 | 4/2012 |

OTHER PUBLICATIONS

International Preliminary Report on Patentability for PCT/JP2020/016968 dated Nov. 4, 2021.

* cited by examiner

AIR-CONDITIONING SYSTEM, MACHINE LEARNING APPARATUS, AND MACHINE LEARNING METHOD

TECHNICAL FIELD

The present disclosure relates to an air-conditioning system, a machine learning apparatus, and a machine learning method.

BACKGROUND ART

Conventionally, an air-conditioning system including an outside air conditioning device that performs air conditioning of a target space by heating or cooling outside air and supplying the outside air to the target space, and an air conditioning device that performs air conditioning of the target space by heating or cooling air in the target space (inside air) and supplying the air to the target space is known.

This air-conditioning system is generally required to achieve both energy saving and comfort. With respect to this, for example, Patent Document 1 discloses a model (a model that determines the operating capacity of each device) that determines a combination of a target value of the evaporation temperature and a target value of the supply air temperature based on a temperature of the outside air, a humidity of the outside air, and an indoor load factor.

RELATED ART DOCUMENT

Patent Document

[Patent Document 1] Japanese Laid-open Patent Publication No. 2018-173264

SUMMARY OF THE INVENTION

Problem to be Solved by the Present Disclosure

However, in order to actually optimize the operating capacity of each device by using the model described above, it is necessary to actually measure data under various operation conditions after installation of the air-conditioning system and construct a model that reflects the characteristics of each device. The workload after the installation is high.

The present disclosure provides an air-conditioning system, a machine learning apparatus, and a machine learning method that optimize the operating capacity of the outside air conditioning device and the operating capacity of the air conditioning device.

Means for Solving Problem

An air-conditioning system according to a first aspect of the present disclosure includes an outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit, an air conditioning device that includes multiple indoor units and a refrigerant adjuster, and that performs air conditioning of the target space by supplying, to the target space, inside air that is cooled or heated by each of the multiple indoor units, the refrigerant adjuster adjusting a state of refrigerant flowing through each of the multiple indoor units, and the inside air being air in the target space, and a machine learning apparatus that performs learning with respect to at least either an operating capacity of the outside air conditioning device or an operating capacity of the air conditioning device, and includes a state variable acquiring unit configured to acquire state variables including a condition of the outside air, a condition of the inside air, an operation condition of the outside air conditioning device, an operation condition of the air conditioning device, and a temperature or humidity set for the target space, a learning unit configured to perform the learning by associating the state variables with at least either the operating capacity of the outside air conditioning device or the operating capacity of the air conditioning device, and a reward calculating unit configured to calculate a reward that correlates with a total of energy consumption of the outside air conditioning device and energy consumption of the air conditioning device. The learning unit performs the learning by using the reward.

According to the first aspect of the present disclosure, an air-conditioning system that optimizes the operating capacity of the outside air conditioning device and the air conditioning device can be provided.

A second aspect of the present disclosure is the air-conditioning system described in the first aspect. The outside air conditioning device includes a first fan configured to take the outside air and supply the supply air to the target space and an outside air conditioner heat exchanger configured to exchange heat between the outside air taken by the first fan and the heating medium, and the operating capacity of the outside air conditioning device includes a target value of a temperature of the supply air, a target value of an air volume of the first fan, a target value of a temperature of the heating medium flowing through the outside air conditioner heat exchanger, and a target value of an evaporation temperature or enthalpy of the heating medium in the outside air conditioner heat exchanger.

A third aspect of the present disclosure is the air-conditioning system described in the second aspect. Each of the multiple indoor units of the air conditioning device includes a second fan that takes the inside air and supplies the inside air to the target space, and an air conditioning heat exchanger configured to exchange heat between the inside air taken by the second fan and the refrigerant, and the operating capacity of the air conditioning device includes a target value of an evaporation temperature in the air conditioning device.

A fourth aspect of the present disclosure is the air-conditioning system described in the third aspect. The condition of the outside air includes a temperature of the outside air or a humidity of the outside air, and the condition of the inside air includes a temperature of the inside air or a humidity of the inside air. The operation condition of the outside air conditioning device includes any of information indicating that the outside air conditioning device is operating or stopped, information indicating that the outside air conditioning device is in a cooling mode or a heating mode, the air volume of the first fan of the outside air conditioning device, a flow rate of the heating medium, the temperature of the heating medium, a pressure of the heating medium, and a setting value of the temperature of the supply air, and the operation condition of the air conditioning device includes any of information indicating that the air conditioning device is operating or stopped, information indicating that the air conditioning device is in a cooling mode or a heating mode, an air volume of the second fan of the air conditioning device, a flow rate of the refrigerant, a temperature of the refrigerant, a pressure of the refrigerant, and a setting value of the evaporation temperature in the air conditioning device.

A fifth aspect of the present disclosure is the air-conditioning system described in the first aspect. The energy consumption of the outside air conditioning device includes respective energy consumption of a chiller unit, the heating medium adjuster, and the outside air conditioning unit included in the outside air conditioning device. The energy consumption of the air conditioning device includes respective energy consumption of the plurality of indoor units and the refrigerant adjuster.

A sixth aspect of the present disclosure is the air-conditioning system described in the fifth aspect. The energy consumption includes any of power consumption, carbon dioxide emissions, and energy cost.

A seventh aspect of the present disclosure is the air-conditioning system described in the first aspect. The learning unit performs the learning in a period determined in accordance with a time duration until the total of the energy consumption changes after at least either the operating capacity of the outside air conditioner or the operating capacity of the air conditioner has changed.

A machine learning apparatus according to an eighth aspect of the present disclosure performs learning with respect to at least either operating capacity of an outside air conditioning device or operating capacity of an air conditioning device in an air-conditioning system including the outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit, and the air conditioning device that includes a plurality of indoor units and a refrigerant adjuster, and that performs air conditioning of the target space by supplying, to the target space, inside air that is cooled or heated by each of the plurality of indoor units, the refrigerant adjuster adjusting a state of refrigerant flowing through each of the plurality of indoor units, and the inside air being air in the target space. The machine learning apparatus includes a state variable acquiring unit configured to acquire state variables including a condition of the outside air, a condition of the inside air, an operation condition of the outside air conditioning device, an operation condition of the air conditioning device, and a temperature or humidity set for the target space, a learning unit configured to perform the learning by associating the state variables with at least either the operating capacity of the outside air conditioning device or the operating capacity of the air conditioning device, and a reward calculating unit configured to calculate a reward that correlates with a total of energy consumption of the outside air conditioning device and energy consumption of the air conditioning device. The learning unit performs the learning by using the reward.

According to the eighth aspect of the present disclosure, a machine learning apparatus that optimizes the operating capacity of the outside air conditioner and the operating capacity of the air conditioner can be provided.

A machine learning method according to a ninth aspect of the present disclosure performs learning with respect to at least either operating capacity of an outside air conditioning device or operating capacity of an air conditioning device in an air-conditioning system including the outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit, and the air conditioning device that includes a plurality of indoor units and a refrigerant adjuster, and that performs air conditioning of the target space by supplying, to the target space, inside air that is cooled or heated by each of the plurality of indoor units, the refrigerant adjuster adjusting a state of refrigerant flowing through each of the plurality of indoor units, and the inside air being air in the target space. The machine learning method includes a state variable acquiring step of acquiring state variables including a condition of the outside air, a condition of the inside air, an operation condition of the outside air conditioning device, an operation condition of the air conditioning device, and a temperature or humidity set for the target space, a learning step of performing the learning by associating the state variables with at least either the operating capacity of the outside air conditioning device or the operating capacity of the air conditioning device, and a reward calculating step of calculating a reward that correlates with a total of energy consumption of the outside air conditioning device and energy consumption of the air conditioning device. The learning step performs the learning by using the reward.

According to the ninth aspect of the present disclosure, a machine learning method that optimizes the operating capacity of the outside air conditioning device and the operating capacity of the air conditioning device can be provided.

EMBODIMENT FOR CARRYING OUT THE INVENTION

Figure 1:
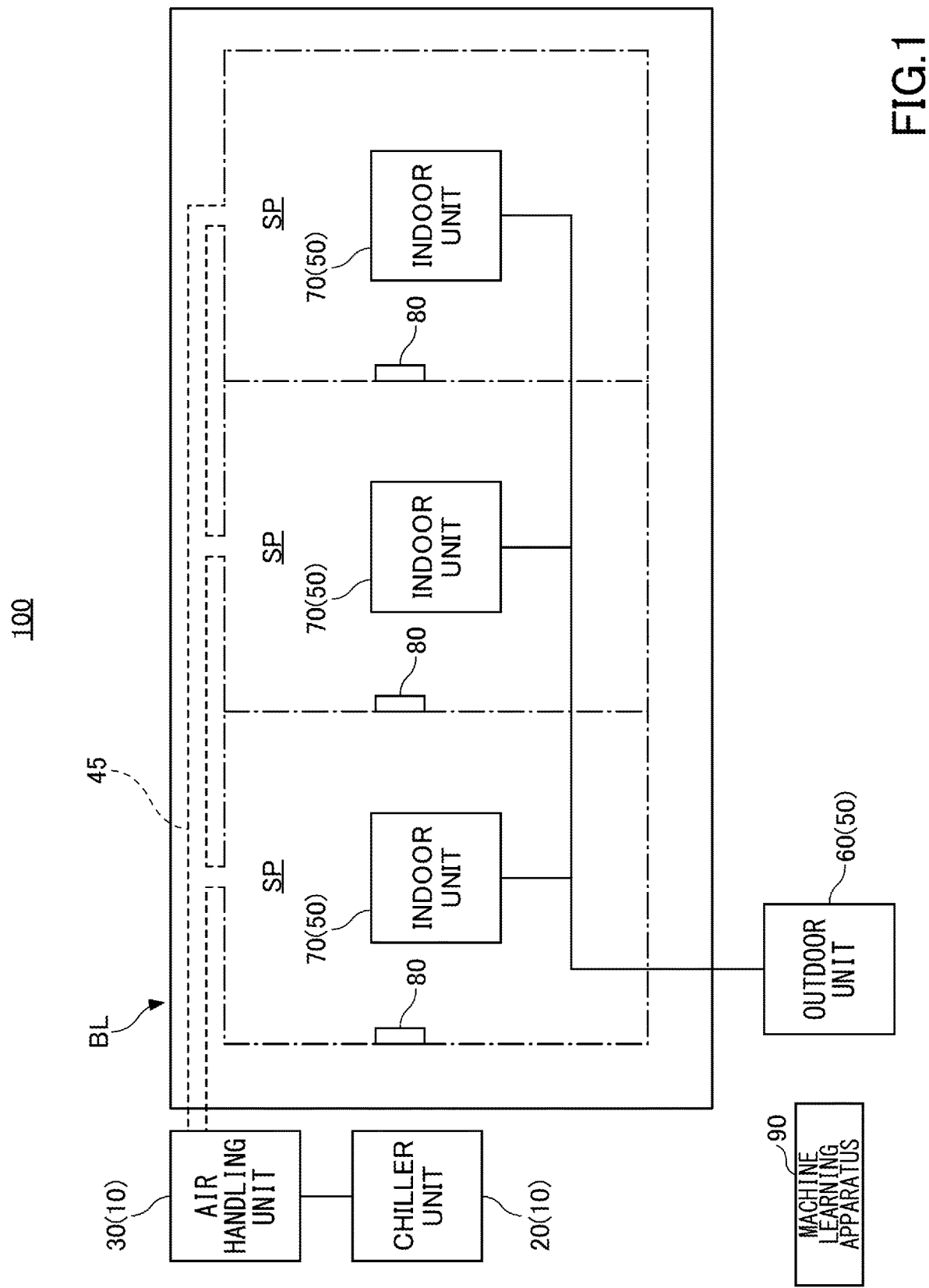
FIG. 1 is a diagram illustrating an example of a system configuration of an air-conditioning system.

In the following, each embodiment will be described with reference to the accompanying drawings. In the present specification and the drawings, components having substantially the same functional configuration are referenced by the same reference numeral and description is omitted.

First Embodiment

<System Configuration of an Air-Conditioning System>

First, a system configuration of an air-conditioning system according to a first embodiment will be described. FIG. 1 is a diagram illustrating an example of the system configuration of the air-conditioning system. An air-conditioning system 100 is a system that achieves air conditioning in a target space SP included in a construction, such as a house, a building, a factory, a public facility, or the like. In the first embodiment, the air-conditioning system 100 is applied to a building BL that includes multiple target spaces SP (SP1, SP2, and SP3).

As illustrated in FIG. 1, the air-conditioning system 100 includes:

an outside air conditioner 10 (an air handling unit and a chiller unit), which is an example of an "outside air conditioning device"

an air conditioner 50 (an indoor unit and an outdoor unit), which is an example of an "air conditioning device"

a remote controller 80 a machine learning apparatus 90

The air-conditioning system 100 performs air conditioning such as cooling, heating, ventilation, dehumidification, and humidification in the target space SP by the outside air conditioner 10 taking outside air and supplying conditioned outside air to the target space SP. The outside air is air outside the target space SP, and is outdoor air in the first embodiment.

Additionally, the air-conditioning system 100 performs air conditioning such as cooling, heating, dehumidification, and the like in the target space SP by the air conditioner 50 taking inside air and supplying conditioned inside air to the target space SP. The inside air is air inside the target space SP.

In the air-conditioning system 100, the air conditioning of the outside air conditioner 10 and the air conditioner 50 is controlled in accordance with commands input to the remote controller 80. Specifically, in the air-conditioning system 100, the machine learning apparatus 90 sets the operating capacity of the outside air conditioner 10 and the operating capacity of the air conditioner 50 (at least either the outside air conditioner 10 or the air conditioner 50, but here, both of the outside air conditioner 10 and the air conditioner 50, which will be described in detail below) in accordance with the commands input to the remote controller 80 and load conditions at that time. The outside air conditioner 10 and the air conditioner 50 operate to achieve the operating capacities set by the machine learning apparatus 90. Here, the commands herein include commands related to start or stop, an operation type, the set temperature, the set humidity, the set air volume, and the like. The load conditions include the temperature of the outside air and the humidity of the outside air, which are conditions of the outside air, and the temperature of the inside air and the humidity of the inside air, which are conditions of the inside air, and the like.

<Detailed Description of the Outside Air Conditioner>

Figure 2:
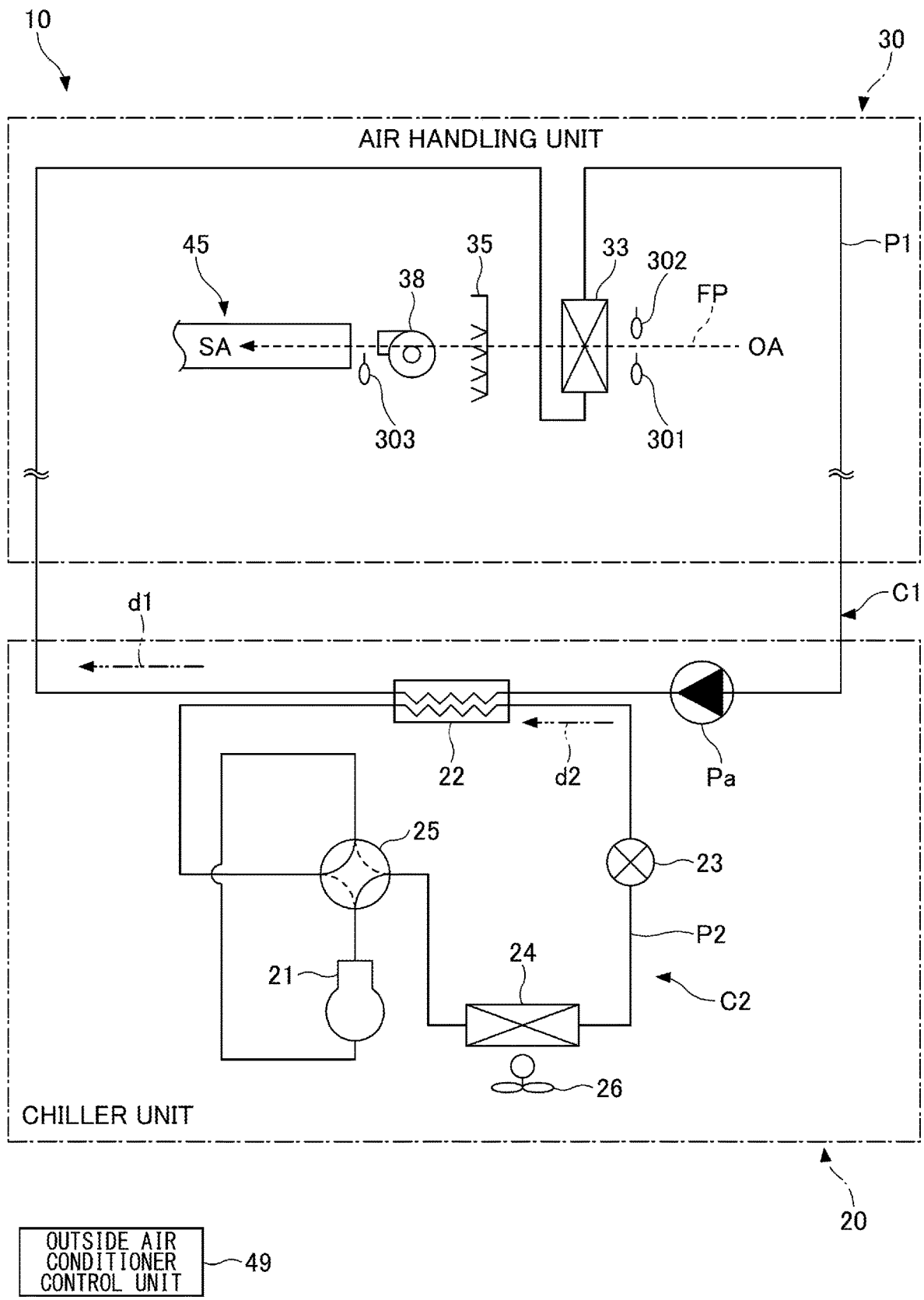
FIG. 2 is a diagram illustrating an example of a configuration of an outside air conditioner.
Figure 3:
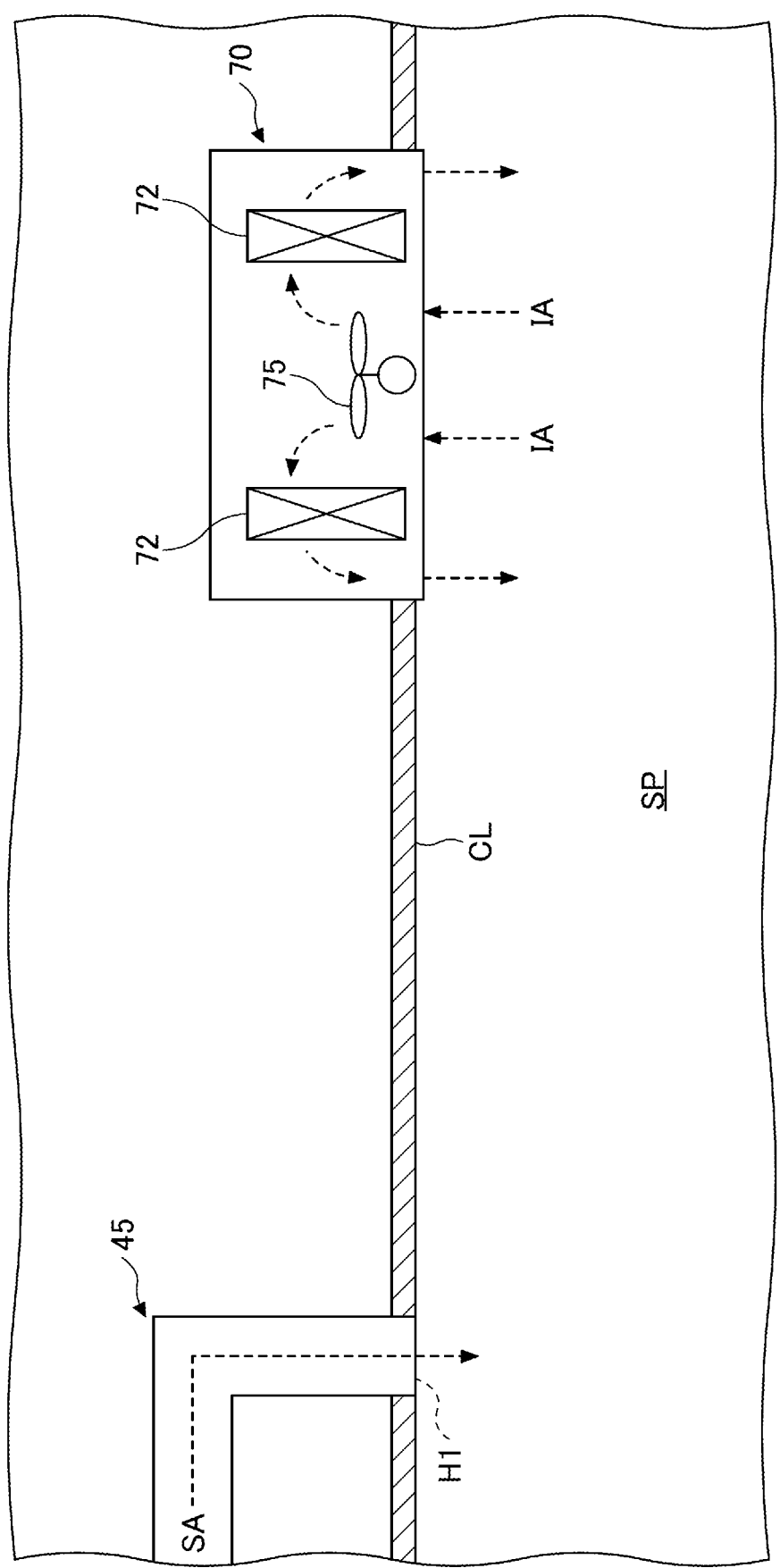
FIG. 3 is a diagram illustrating an example of an installation of an air supply duct and an indoor unit in a target space.

Next, the outside air conditioner 10 will be described in detail with reference to FIG. 2 and FIG. 3. FIG. 2 is a diagram illustrating a configuration example of the outside air conditioner. FIG. 3 is a diagram illustrating an installation example of an air supply duct and an indoor unit in the target space.

(1) Description of the Entire Outside Air Conditioner

First, the entire outside air conditioner 10 will be described. Generally, in the outside air conditioner, there are two types of methods of exchanging heat between the outside air and the heating medium, namely, a method in which the heating medium does not change between phases (a central method) and a method in which the heating medium vaporizes or condenses (changes between phases). The outside air conditioner 10 illustrated in FIG. 2 and other drawings, may use any method. Here, the outside air conditioner 10 is formed using a central method, and mainly includes a chiller unit 20, an air handling unit 30, an air supply duct 45, and an outside air conditioner control unit 49. The outside air conditioner 10 takes outside air OA at the air handling unit 30 during operation, cools or heats, or dehumidifies or humidifies the outside air OA, and supplies the outside air OA to the target space SP as supply air SA through the air supply duct 45.

In the outside air conditioner 10, a heating medium circuit C1 and an outside air conditioner refrigerant circuit C2 are configured independently of each other.

The heating medium circuit C1 is a circuit in which a heating medium (here, water (cooling water)) that exchanges heat with the outside air OA circulates. The heating medium circuit C1 is configured to be over the chiller unit 20 and the air handling unit 30. The heating medium circuit C1 mainly includes an outside air heat exchanger 33 disposed in the air handling unit 30, a heating medium heat exchanger 22 disposed in the chiller unit 20, and a heating medium pump Pa that are connected through first piping P1. During operation of the outside air conditioner 10, in the heating medium circuit C1, the heating medium pump Pa is controlled to be in an operation state, so that the heating medium flows in a predetermined direction (a direction indicated by the dot-dash line arrow d1 in FIG. 2). The flow rate of the heating medium in the heating medium circuit C1 is mainly adjusted by the number of rotations of the heating medium pump Pa.

The outside air conditioner refrigerant circuit C2 is a circuit in which the refrigerant serving as a cooling source or heating source of the heating medium within the heating medium circuit C1 circulates. The outside air conditioner refrigerant circuit C2 is configured within the chiller unit 20. The outside air conditioner refrigerant circuit C2 mainly includes a refrigerant compressor 21, a heating medium heat exchanger 22, a refrigerant expansion valve 23, a refrigerant heat exchanger 24, and a flow path switching valve 25, disposed in the chiller unit 20, that are connected through second piping P2. During operation of the outside air conditioner 10, in the outside air conditioner refrigerant circuit C2, the refrigerant compressor 21 is controlled in an operation state and the opening of the refrigerant expansion valve 23 is controlled. This allows the refrigerant to flow in a predetermined direction (a direction indicated by the dot-dash line arrow d2 in FIG. 2 during a normal cycle operation and a direction opposite to the direction indicated by d2 in a reverse cycle operation) in the outside air conditioner refrigerant circuit C2.

(2) Details of the Chiller Unit

Next, the chiller unit 20 constituting the outside air conditioner 10 will be described in detail. The chiller unit 20 performs a refrigerant cycle in the outside air conditioner refrigerant circuit C2 to cool or heat the heating medium in the heating medium circuit C1. The chiller unit 20 mainly includes the refrigerant compressor 21, the heating medium heat exchanger 22, the refrigerant expansion valve 23, the refrigerant heat exchanger 24, the flow path switching valve 25, a chiller fan 26, and the heating medium pump Pa.

The refrigerant compressor 21 is a device that compresses low-pressure refrigerant to be high pressure in a refrigerant cycle. Here, as the refrigerant compressor 21, a compressor having a sealed structure in which a compressor motor is incorporated is employed. In the refrigerant compressor 21, for example, a scroll-type and positive-displacement-type compressor element is accommodated and is rotatably driven by a compressor motor. The compressor motor is controlled by an inverter at an operating frequency, thereby performing capacity control of the refrigerant compressor 21. That is, the refrigerant compressor 21 is variable in capacity.

The heating medium heat exchanger 22 is a heat exchanger that exchanges heat between the heating medium in the heating medium circuit C1 and the low pressure refrigerant in the outside air conditioner refrigerant circuit C2 to cool the heating medium. In the heating medium heat exchanger 22, a heating medium flow path communicating with the heating medium circuit C1 and a refrigerant flow path communicating with the outside air conditioner refrigerant circuit C2 are formed, and the heating medium heat exchanger 22 is configured to exchange heat between the heating medium in the heating medium flow path and the refrigerant in the refrigerant flow path. The heating medium heat exchanger 22 functions as an evaporator of the low pressure refrigerant in the positive cycle operation (a cooling operation or dehumidification operation) and as a condenser or a radiator of the high pressure refrigerant in reverse cycle operation (a heating operation).

The refrigerant expansion valve 23 is a valve that functions as a decompression means or flow control means of the refrigerant. In the first embodiment, the refrigerant expansion valve 23 is an electric expansion valve that can control the opening.

The refrigerant heat exchanger 24 is a heat exchanger that exchanges heat between the refrigerant in the outside air conditioner refrigerant circuit C2 and passing air. The refrigerant heat exchanger 24 includes a heat transfer tube communicating with the outside air conditioner refrigerant circuit C2 and heat transfer fins. In the refrigerant heat exchanger 24, heat is exchanged between air passing around the heat transfer tube and the heat transfer fins (an air flow generated by the chiller fan 26) and refrigerant passing through the heat transfer tube. The refrigerant heat exchanger 24 functions as a condenser or a radiator of the high pressure refrigerant in the positive cycle operation and functions as an evaporator of the low pressure refrigerant in the reverse cycle operation.

The flow path switching valve 25 switches the flow of the outside air conditioner refrigerant circuit C2. The flow path switching valve 25 has four connecting ports and the four connecting ports are respectively connected to a suction pipe and a discharge pipe of the refrigerant compressor 21, the refrigerant flow path of the heating medium heat exchanger 22 on the gas side, and the refrigerant heat exchanger 24 on the gas side.

Specifically, the flow path switching valve 25 can switch between a first state and a second state. The first state is a state in which the refrigerant flow path of the heating medium heat exchanger 22 on the gas side communicates with the suction pipe of the refrigerant compressor 21 and the discharge pipe of the refrigerant compressor 21 communicates with the refrigerant heat exchanger 24 on the gas side (see solid line of the flow path switching valve 25 in FIG. 2). The second state is a state in which the discharge pipe of the refrigerant compressor 21 communicates with the refrigerant flow path of the heating medium heat exchanger 22 on the gas side and the refrigerant heat exchanger 24 on the gas side communicates with the suction pipe of the refrigerant compressor 21 (see the dotted line of the flow path switching valve 25 in FIG. 2). The flow path switching valve 25 is controlled to be in the first state in the positive cycle operation (the cooling operation or the dehumidification operation) and is controlled to be in the second state in the reverse cycle operation (the heating operation).

The chiller fan 26 is a fan producing an air flow that enters the chiller unit 20, passes through the refrigerant heat exchanger 24, and flows out of the chiller unit 20. The air flow produced by the chiller fan 26 is the cooling source of the refrigerant in the refrigerant heat exchanger 24 during the positive cycle operation and the heating source of the refrigerant in the refrigerant heat exchanger 24 during the reverse cycle operation. The chiller fan 26 includes a fan motor, and the fan motor is controlled by inverter control to adjust the number of rotations. That is, the chiller fan 26 is variable in the air volume.

The heating medium pump Pa (a heating medium adjuster) is disposed in the heating medium circuit C1. During the operation of the outside air conditioner 10, the heating medium pump Pa applies suction to the heating medium and discharges the heating medium. The heating medium pump Pa includes a motor that is a driving source, and the number of rotations is adjusted by inverter control of the motor. That is, the heating medium pump Pa is variable in the discharge flow rate.

(3) Details of the Air Handling Unit (the Air Conditioning Unit)

Next, the air handling unit 30 constituting the outside air conditioner 10 will be described in detail. The air handling unit 30 cools, dehumidifies, heats, and/or humidifies the outside air OA. The air handling unit 30 mainly includes the outside air heat exchanger 33, a humidifier 35, and an air supply fan 38.

The outside air heat exchanger 33 (the outside air conditioner heat exchanger) is a heat exchanger that functions as a cooler of the outside air OA. The outside air heat exchanger 33 is disposed in the heating medium circuit C1. The outside air heat exchanger 33 includes a heat transfer tube and heat transfer fins communicating with the heating medium circuit C1. In the outside air heat exchanger 33, heat is exchanged between the outside air OA, passing around the heat transfer tube and the heat transfer fins, and the heat transfer medium passing through the heat transfer tube.

The humidifier 35 is a device that humidifies the outside air OA that has passed through the outside air heat exchanger 33. The method or model of the humidifier 35 is not particularly limited, but a typical natural evaporative humidifier is employed herein.

The air supply fan 38 (a first fan) is a fan that takes the outside air OA into the air handling unit 30 and supplies the outside air OA to the air supply duct 45. Although the model of the air supply fan 38 is not particularly limited, in the first embodiment, a Sirocco fan is employed as the air supply fan 38. Here, in the air handling unit 30, an outside air flow path FP through which the outside air OA flows is formed (refer to the dashed line "FP" of FIG. 2), and when the air supply fan 38 is in an operational state, the outside air OA flows along the outside air flow path FP. The air supply fan 38 includes a fan motor, and the number of rotations is adjusted by inverter control of the motor. That is, the air supply fan 38 is variable in the air volume.

In the air handling unit 30, the outside air heat exchanger 33, the humidifier 35, and the air supply fan 38 are arranged from the upwind side of the outside air flow path FP to the downwind side of the outside air flow path FP. The end of the outside air flow path FP on the downwind side is connected to the air supply duct 45.

Additionally, various sensors are disposed in the air handling unit 30. Various sensors disposed in the air handling unit 30 include, for example, an outside air temperature sensor 301 that detects the temperature of the outside air OA sucked into the air handling unit 30, and an outside air humidity sensor 302 that detects the humidity. Additionally, for example, a supply air temperature sensor 303 that detects the temperature of the supply air SA (the supply air temperature) supplied to the air supply duct 45 (that is, the target space SP) is included.

(4) Details of the Air Supply Duct

Next, the air supply duct 45 constituting the outside air conditioner 10 will be described in detail. The air supply duct 45 is a member that forms the flow path of the outside air OA. One end of the air supply duct 45 is connected to the air handling unit 30, so that the outside air OA flows into the air supply duct 45 when the air supply fan 38 is driven. The other end of the air supply duct 45 is branched to communicate with the target space SP at each branch.

As illustrated in FIG. 3, the other end (for each branch) of the air supply duct 45 is connected to an intake hole H1 formed in a ceiling CL of the target space SP.

(5) Details of the Outside Air Conditioner Control Unit

Next, the outside air conditioner control unit 49 constituting the outside air conditioner 10 will be described. The outside air conditioner control unit 49 is a function unit that controls the operation of respective units included in the outside air conditioner 10. The outside air conditioner control unit 49 includes a CPU, a memory, and various electrical components. The outside air conditioner control unit 49 is connected to respective devices included in the outside air conditioner 10 through wiring. Additionally, the outside air conditioner control unit 49 is electrically connected to the remote controller 80 and the machine learning apparatus 90 through a communication line.

In the first embodiment, the outside air conditioner control unit 49 includes respective microcomputers and respective electrical components disposed in the chiller unit 20 and the air handling unit 30, that are electrically connected to each other.

The outside air conditioner control unit 49 sets a target value of the air supply temperature (a target supply air temperature Tsa) in accordance with a set temperature and a load condition (here, in the first embodiment, the target value of the supply air temperature is set by the machine learning apparatus 90). The outside air conditioner control unit 49 appropriately adjusts the operations of respective units (for example, the capacity of the refrigerant compressor 21, the opening of the refrigerant expansion valve 23, the number of rotations of the heating medium pump Pa, start or stop of the humidifier 35, the number of rotations of the air supply fan 38, and the like) based on the target supply air temperature Tsa. This appropriately changes the operating capacity of the outside air conditioner 10.

The "operating capacity" of the outside air conditioner 10 here mainly refers to the cooling (dehumidification) capacity and the heating capacity. Specifically, the operating capacity of the outside air conditioner 10 is directly determined based on the condition of the heating medium flowing through the outside air conditioner heat exchanger (the flow rate, the temperature, the pressure, the enthalpy, and the like) and/or the air flow rate of the first fan, and is indirectly determined based on a predetermined target value (for example, a target value of the supply air temperature and the like).

When cooling is performed by supplying the outside air OA without latent heat treatment or sensible heat treatment (i.e., when an outside air cooling operation is performed), the outside air conditioner control unit 49 pauses or stops the operations of respective units of the chiller unit 20.

(6) Flow of the Heating Medium, the Refrigerant, the Cooling Water, and the Air During the Operation of the Outside Air Conditioner Next, a flow of the heating medium, the refrigerant, the cooling water, and the air during the operation of the outside air conditioner 10 will be described. During the operation of the outside air conditioner 10, typically the heating medium pump Pa is driven and the heating medium circulates in the heating medium circuit C1. Additionally, the refrigerant compressor 21 is driven and the refrigerant circulates in the outside air conditioner refrigerant circuit C2.

During the operation of the outside air conditioner 10, in the heating medium circuit C1, the heating medium is cooled or heated by the heating medium heat exchanger 22 exchanging heat with the refrigerant flowing through the outside air conditioner refrigerant circuit C2. Specifically, the heating medium is cooled in the positive cycle operation, and the heating medium is heated in the reverse cycle operation. The heating medium cooled or heated in the heating medium heat exchanger 22 flows into the outside air heat exchanger 33 and is heated or cooled by exchanging heat with the outside air OA taken in the air handling unit 30. Specifically, the heating medium is heated in the positive cycle operation and cooled in the reverse cycle operation. The heating medium passing through the outside air heat exchanger 33 flows into the heating medium heat exchanger 22 again.

During the operation of the outside air conditioner 10, in the outside air conditioner refrigerant circuit C2, the refrigerant is compressed by the refrigerant compressor 21 and discharged as the high pressure refrigerant. The high pressure refrigerant discharged from the refrigerant compressor 21 is condensed or radiated by the refrigerant heat exchanger 24 exchanging heat with the air flow produced by the chiller fan 26 during the positive cycle operation. Additionally, the high pressure refrigerant discharged from the refrigerant compressor 21 is condensed or radiated by the heating medium heat exchanger 22 exchanging heat with the heating medium in the heating medium circuit C1 during the reverse cycle operation. The refrigerant condensed or radiated at one heat exchanger among the refrigerant heat exchanger 24 and the heating medium heat exchanger 22 is depressurized at the refrigerant expansion valve 23 to become a low pressure refrigerant, and then is flowed into the other heat exchanger and evaporated or heated by exchanging heat with the heating medium or the air flow. Subsequently, the refrigerant is sucked into the refrigerant compressor 21.

In the outside air heat exchanger 33, heat is exchanged between the outside air OA and the heating medium. Specifically, the outside air OA is cooled (or dehumidified) during the cooling operation and the outside air OA is heated during the heating operation. The outside air OA passing through the outside air heat exchanger 33 is supplied to the air supply duct 45 (the target space SP). When the humidifier 35 is in operation, air heated by exchanging heat with the heating medium in the outside air heat exchanger 33 is humidified by the humidifier 35 and then is supplied to the air supply duct 45.

<Details of the Air Conditioner>

Figure 4:
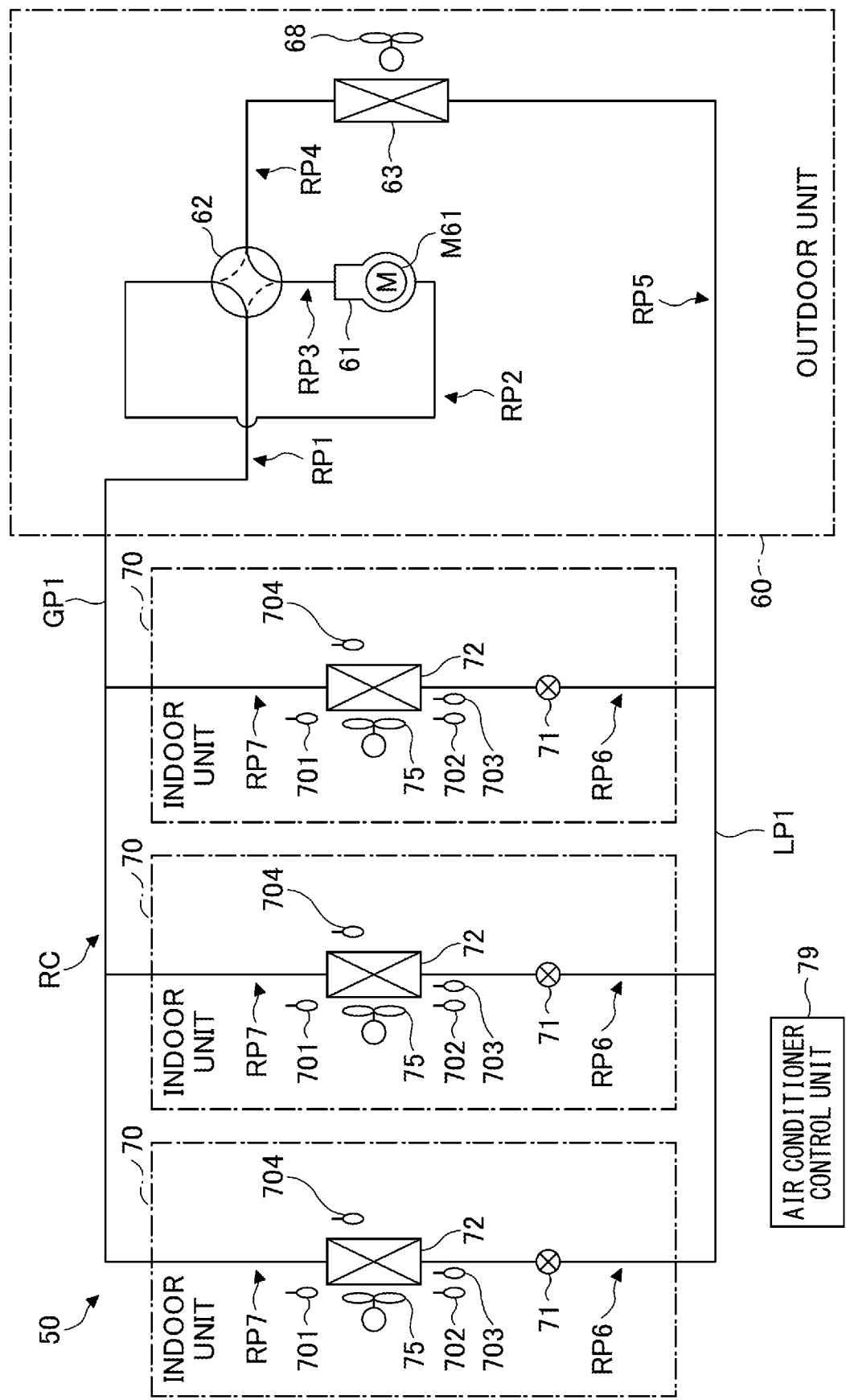
FIG. 4 is a diagram illustrating an example of a configuration of an air conditioner.

Next, the air conditioner 50 (the air conditioning device) will be described in detail with reference to FIG. 4. FIG. 4 is a diagram illustrating a configuration example of the air conditioner.

(1) Description of the Entire Air Conditioner

First, the entire air conditioner 50 will be described. The air conditioner 50 includes a refrigerant circuit RC, and by circulating the refrigerant in the refrigerant circuit RC to perform a refrigeration cycle of a vapor compression method, air conditioning in the target space SP, such as cooling, dehumidification, or heating is achieved. The air conditioner 50 has multiple operation modes and performs an operation in accordance with the operation mode. Specifically, the air conditioner 50 has a cooling mode for cooling, a dehumidification mode for dehumidification, a heating mode for heating, and the like, and is operated in accordance with respective operation modes.

The air conditioner 50 mainly includes one outdoor unit 60 that functions as a heat source unit, multiple indoor units 70 (here, three units) that function as utilization units, and an air conditioner control unit 79. In the air conditioner 50, the outdoor unit 60 and the respective indoor units 70 are connected through a liquid-side refrigerant connection pipe LP1 and a gas-side refrigerant connection pipe GP1 to form the refrigerant circuit RC. The refrigerant enclosed in the refrigerant circuit RC is not particularly limited, but an HFC refrigerant such as R32 or R410A is enclosed in the refrigerant circuit RC.

(2) Details of the Outdoor Unit

Next, the outdoor unit 60 (a refrigerant adjuster) constituting the air conditioner 50 will be described in detail. The outdoor unit 60 is disposed outside of the target space SP. In the first embodiment, the outdoor unit 60 is disposed outdoors.

The outdoor unit 60 is connected to the indoor unit 70 through the liquid-side refrigerant connection pipe LP1 and the gas-side refrigerant connection pipe GP1, and forms a portion of the refrigerant circuit RC. The outdoor unit 60 mainly includes a compressor 61, a four-way switching valve 62, an outdoor heat exchanger 63, and an outdoor fan 68.

Additionally, the outdoor unit 60 includes multiple refrigerant pipes RP (a first refrigerant pipe RP1 to a fifth refrigerant pipe RP5). The first refrigerant pipe RP1 connects the gas-side refrigerant connection pipe GP1 to the four-way switching valve 62. The second refrigerant pipe RP2 connects the four-way switching valve 62 to the compressor 61 on the suction side. The third refrigerant pipe RP3 connects the compressor 61 on the discharge side to the four-way switching valve 62. The fourth refrigerant pipe RP4 connects the four-way switching valve 62 to a gas side inlet/outlet of the outdoor heat exchanger 63. The fifth refrigerant pipe RP5 connects a liquid-side inlet/outlet of the outdoor heat exchanger 63 to the liquid-side refrigerant connection pipe LP1.

The compressor 61 is a device that compresses the low pressure refrigerant in the refrigeration cycle to be a high pressure. Here, as the compressor 61, a compressor having a sealed structure in which a compressor motor M61 is incorporated is employed. A positive displacement compressor element (which is not illustrated) such as a rotary type or a scroll type is accommodated in the compressor 61, and the compressor motor M61 rotationally drives the compressor element. The operation frequency of the compressor motor M61 is controlled by an inverter, and this controls the capacity of the compressor 61. That is, the compressor 61 is variable in the capacity.

The four-way switching valve 62 is a flow path switching means that switches a flow direction of the refrigerant in the refrigerant circuit RC. Each state of the four-way switching valve 62 is controlled depending on a situation. The four-way switching valve 62 connects the first refrigerant pipe RP1 to the second refrigerant pipe RP2 and connects the third refrigerant pipe RP3 to the fourth refrigerant pipe RP4 during the positive cycle operation (the cooling operation or dehumidification operation). This controls the four-way switching valve 62 to be in a first state (refer to the solid line in the four-way switching valve 62 in FIG. 4). Additionally, the four-way switching valve 62 connects the first refrigerant pipe RP1 to the third refrigerant pipe RP3 and connects the second refrigerant pipe RP2 to the fourth refrigerant pipe RP4 during the reverse cycle operation (the heating operation). This controls the four-way switching valve 62 to be in a second state (see the dashed line in the four-way switching valve 62 in FIG. 4).

The outdoor heat exchanger 63 is a heat exchanger that exchanges heat between a passing air flow (an outside air flow generated by the outdoor fan 68) and the refrigerant. The outdoor heat exchanger 63 functions as a condenser or a radiator of the refrigerant during the positive cycle operation. The outdoor heat exchanger 63 functions as an evaporator of the refrigerant during the reverse cycle operation.

The outdoor fan 68 is a fan that produces the outside air flow. The outside air flow is a flow of the outside air OA that flows into the outdoor unit 60, that passes through the outdoor heat exchanger 63, and that flows out of the outdoor unit 60. The outside air flow is a cooling source of the refrigerant in the outdoor heat exchanger 63 during the positive cycle operation and a heating source of the refrigerant in the outdoor heat exchanger 63 during the reverse cycle operation. The outdoor fan 68 includes a fan motor, and the number of rotations is adjusted by inverter control of the fan motor. That is, the outdoor fan 68 is variable in the air volume.

Additionally, various sensors are disposed in the outdoor unit 60. Examples of the various sensors disposed in the outdoor unit 60 include a suction pressure sensor that detects the pressure of the refrigerant sucked into the compressor 61, a discharge pressure sensor that detects the pressure of the refrigerant discharged from the compressor 61 (which are not illustrated), and the like.

(3) Details of the Indoor Unit

Next, the indoor units 70 constituting the air conditioner 50 will be described in detail. The indoor units 70 are disposed in the target space SP. In the first embodiment, the indoor unit 70 corresponds to any one of the target spaces SP and is installed in each of the target spaces SP. In the first embodiment, each of the indoor units 70 is a ceiling embedded air conditioning indoor unit installed in the ceiling CL of the target space SP (see, for example, FIG. 3). Each of the indoor units 70 is installed such that the inlet/outlet are exposed from the ceiling CL in the target space SP.

As illustrated in FIG. 4, the indoor unit 70 is connected to the outdoor unit 60 through the liquid-side refrigerant connection pipe LP1 and the gas-side refrigerant connection pipe GP1 and forms a portion of the refrigerant circuit RC. In the first embodiment, three indoor units 70 are connected to one outdoor unit 60. Each of the indoor units 70 is arranged in parallel with one another.

Each of the indoor units 70 includes an expansion valve 71 and an indoor heat exchanger 72. Additionally, each of the indoor units 70 includes a sixth refrigerant pipe RP6 connecting a liquid-side inlet/outlet of the indoor heat exchanger 72 to the liquid-side refrigerant connection pipe LP1, and a seventh refrigerant pipe RP7 connecting a gas-side inlet/outlet of the indoor heat exchanger 72 to the gas-side refrigerant connection pipe GP1.

The expansion valve 71 is a valve that functions as a decompression or flow control means for the refrigerant. In the first embodiment, the expansion valve 71 is an electric expansion valve configured to control the opening degree and is disposed in the sixth refrigerant pipe RP6 (more specifically, between the indoor heat exchanger 72 and the liquid-side refrigerant connection pipe LP1).

The indoor heat exchanger 72 (the air conditioning heat exchanger) is a heat exchanger that exchanges heat between a passing air flow (an inside air flow produced by the indoor fan 75) and the refrigerant. The indoor heat exchanger 72 functions as an evaporator of the refrigerant during the positive cycle operation. The outdoor heat exchanger 63 functions as a condenser or a radiator of the refrigerant during the reverse cycle operation.

The indoor fan 75 (a second fan) is a fan that produces the inside air flow. The inside air flow is a flow of inside air IA that flows into the indoor unit 70, that passes through the indoor heat exchanger 72, and that flows out of the indoor unit 70 (see FIG. 3). The inside air flow is a heating source of the refrigerant in the indoor heat exchanger 72 during the positive cycle operation and a cooling source of the refrigerant in the indoor heat exchanger 72 during the reverse cycle operation. The indoor fan 75 includes a fan motor, and the number of rotations is adjusted by inverter control of the fan motor. That is, the indoor fan 75 is variable in the air volume.

Additionally, various sensors are disposed in the indoor unit 70. Examples of various sensors disposed in the indoor unit 70 include an indoor temperature sensor 701 that detects the temperature of the inside air flow (the inside air IA) that is sucked into the indoor unit 70, and an indoor humidity sensor 702 that detects the humidity. The examples also include a carbon dioxide concentration sensor 703 that detects the carbon dioxide concentration, and a refrigerant temperature sensor 704 that detects the temperature of the refrigerant in the indoor heat exchanger 72. The refrigerant temperature sensor 704 is disposed in the indoor heat exchanger 72 and detects the evaporation temperature of the refrigerant during the positive cycle operation.

(4) Details of the Air Conditioner Control Unit

Next, the air conditioner control unit 79 constituting the air conditioner 50 will be described in detail. The air conditioner control unit 79 is a function unit that controls operations of respective units included in the air conditioner 50. The air conditioner control unit 79 includes a CPU, a memory, various electrical components, and the like. The air conditioner control unit 79 is connected to respective devices included in the air conditioner 50 through wiring. Additionally, the air conditioner control unit 79 is electrically connected to various sensors disposed in the indoor unit 70. Further, the air conditioner control unit 79 is communicatively connected to the remote controller 80 installed in the common target spaces SP. The air conditioner control unit 79 is electrically connected to the remote controller 80 and the machine learning apparatus 90 through a communication line.

In the first embodiment, the air conditioner control unit 79 is configured by respective microcomputers and respective electrical components disposed in the outdoor unit 60 and each of the indoor units 70 being electrically connected to one another.

The air conditioner control unit 79 sets a target value of the evaporation temperature (the target evaporation temperature Te) for each of the indoor units 70 in accordance with the set temperature and the load conditions (here, in the first embodiment, a target value of the evaporation temperature is set by the machine learning apparatus 90). The air conditioner control unit 79 appropriately adjusts the capacity of the compressor 61, the air volume of the outdoor fan 68, and the like, based on the target evaporation temperature Te. This changes the operating capacity of the air conditioner 50.

Here, the "operating capacity" of the air conditioner 50 herein refers mainly to the cooling (dehumidification) capacity and the heating capacity. Specifically, the operating capacity of the air conditioner 50 is determined directly based on a state of the refrigerant flowing through the air conditioning heat exchanger (the flow rate, the temperature, the pressure, the enthalpy, and the like), the air flow rate of the second fan, and/or the like and indirectly based on a predetermined target value (e.g., a target value of the evaporation temperature of the refrigerant and the like).

(5) Flow of the Refrigerant in the Refrigerant Circuit

Next, a flow of the refrigerant in the refrigerant circuit during the operation of the air conditioner 50 will be described separately for the positive cycle operation and the reverse cycle operation.

(5-1) During the Positive Cycle Operation

In the air conditioner 50, the four-way switching valve 62 is controlled to be in the first state during the positive cycle operation (the cooling operation or the dehumidification operation). This causes the refrigerant filled in the refrigerant circuit RC to mainly circulate in the order of the compressor 61, the outdoor heat exchanger 63, the expansion valve 71 of the indoor unit 70 in operation, and the indoor heat exchanger 72 of the indoor unit 70 in operation (the refrigerant circulates in the positive cycle).

When the positive cycle operation starts, the capacity control is performed in accordance with the cooling load (specifically, the target evaporation temperature Te) required by each of the indoor units 70. Specifically, in the refrigerant circuit RC, the refrigerant is sucked into the compressor 61 and is discharged after compression. The number of rotations of the compressor 61 is adjusted appropriately. The gas refrigerant discharged from the compressor 61 flows into the gas side inlet/outlet of the outdoor heat exchanger 63 through the third refrigerant pipe RP3, the four-way switching valve 62, and the fourth refrigerant pipe RP4.

The gas refrigerant flowing into the gas side inlet/outlet of the outdoor heat exchanger 63 radiates heat and condenses by exchanging heat with the outside air OA supplied by the outdoor fan 68, becomes liquid refrigerant in the supercooled state, and flows out from the liquid side inlet/outlet of the outdoor heat exchanger 63. The liquid refrigerant flowing out from the liquid side inlet/outlet of the outdoor heat exchanger 63 flows into the indoor unit 70 in operation through the fifth refrigerant pipe RP5 and the liquid-side refrigerant connection pipe LP1.

The refrigerant flowing into the indoor unit 70 flows in the sixth refrigerant pipe RP6, flows into the expansion valve 71, is depressurized, and then flows into the liquid side inlet/outlet of the indoor heat exchanger 72. Here, the opening degree of the expansion valve 71 is adjusted appropriately. The refrigerant flowing into the liquid side inlet/outlet of the indoor heat exchanger 72 evaporates by exchanging heat with the inside air IA supplied by the indoor fan 75, becomes gas refrigerant in the superheated state, and flows out from the gas side inlet/outlet of the indoor heat exchanger 72.

The gas refrigerant flowing out from the gas side inlet/outlet of the indoor heat exchanger 72 passes through the seventh refrigerant pipe RP7, the gas-side refrigerant connection pipe GP1, the first refrigerant pipe RP1, the four-way switching valve 62, and the second refrigerant pipe RP2, and is then sucked into the compressor 61 again.

(5-2) During the Reverse Cycle Operation

In the air conditioner 50, the four-way switching valve 62 is controlled to be in the second state during the reverse cycle operation (the heating operation). This causes the refrigerant filled in the refrigerant circuit RC to mainly circulate in the order of the compressor 61, the indoor heat exchanger 72 of the indoor unit 70 in operation, the expansion valve 71 of the indoor unit 70 in operation, and the outdoor heat exchanger 63 (the refrigerant circulates in the reverse cycle).

When the reverse cycle operation starts, the capacity control is performed in accordance with the heating load required by each of the indoor units 70. Specifically, in the refrigerant circuit RC, the refrigerant is sucked into the compressor 61 and is discharged after compression. Here, the number of rotations of the compressor 61 is appropriately adjusted. The gas refrigerant discharged from the compressor 61 flows into the indoor unit 70 in operation through the second refrigerant pipe RP2, the four-way switching valve 62, and the first refrigerant pipe RP1, flows through the seventh refrigerant pipe RP7, and flows into the gas side inlet/outlet of the indoor heat exchanger 72.

The gas refrigerant flowing into the gas side inlet/outlet of the indoor heat exchanger 72 radiates heat and condenses by exchanging heat with the inside air IA supplied by the indoor fan 75, becomes a liquid refrigerant in the supercooled state, and flows out from the liquid side inlet/outlet of the indoor heat exchanger 72. The liquid refrigerant flowing out from the inlet/outlet of the indoor heat exchanger 72 flows into the expansion valve 71 through the fifth refrigerant pipe RP5, is depressurized, and then flows out from the indoor unit 70. Here, the opening degree of the expansion valve 71 is appropriately adjusted.

The refrigerant flowing out from the indoor unit 70 flows into the outdoor unit 60 through the liquid-side refrigerant connection pipe LP1. The refrigerant flowing into the outdoor unit 60 flows into the liquid side inlet/outlet of the outdoor heat exchanger 63 through the fifth refrigerant pipe RP5. The refrigerant flowing into the outdoor heat exchanger 63 evaporates by exchanging heat with the outside air OA supplied by the outdoor fan 68, becomes the gas refrigerant in the superheated state, and flows out from the gas side inlet/outlet of the outdoor heat exchanger 63. The refrigerant flowing out from the outdoor heat exchanger 63 flows through the fourth refrigerant pipe RP4, the four-way switching valve 62, and the second refrigerant pipe RP2, and is sucked into the compressor 61 again.

<Details of the Remote Controller>

Next, the remote controller 80 will be described in detail. The remote controller 80 is an input device used by a user that inputs various commands individually switch start or stop, the operation type, the set temperature, the set humidity, and the set air volume of the outside air conditioner 10 and the air conditioner 50. Additionally, the remote controller 80 functions as a display device that displays predetermined information (for example, the input various commands, the temperature and humidity of the inside air IA, the temperature and humidity of the outside air OA, and the like).

<Details of the Machine Learning Apparatus>

Next, the machine learning apparatus 90 will be described in detail.

(1) Description of an Outline of the Machine Learning Apparatus

Figure 5:
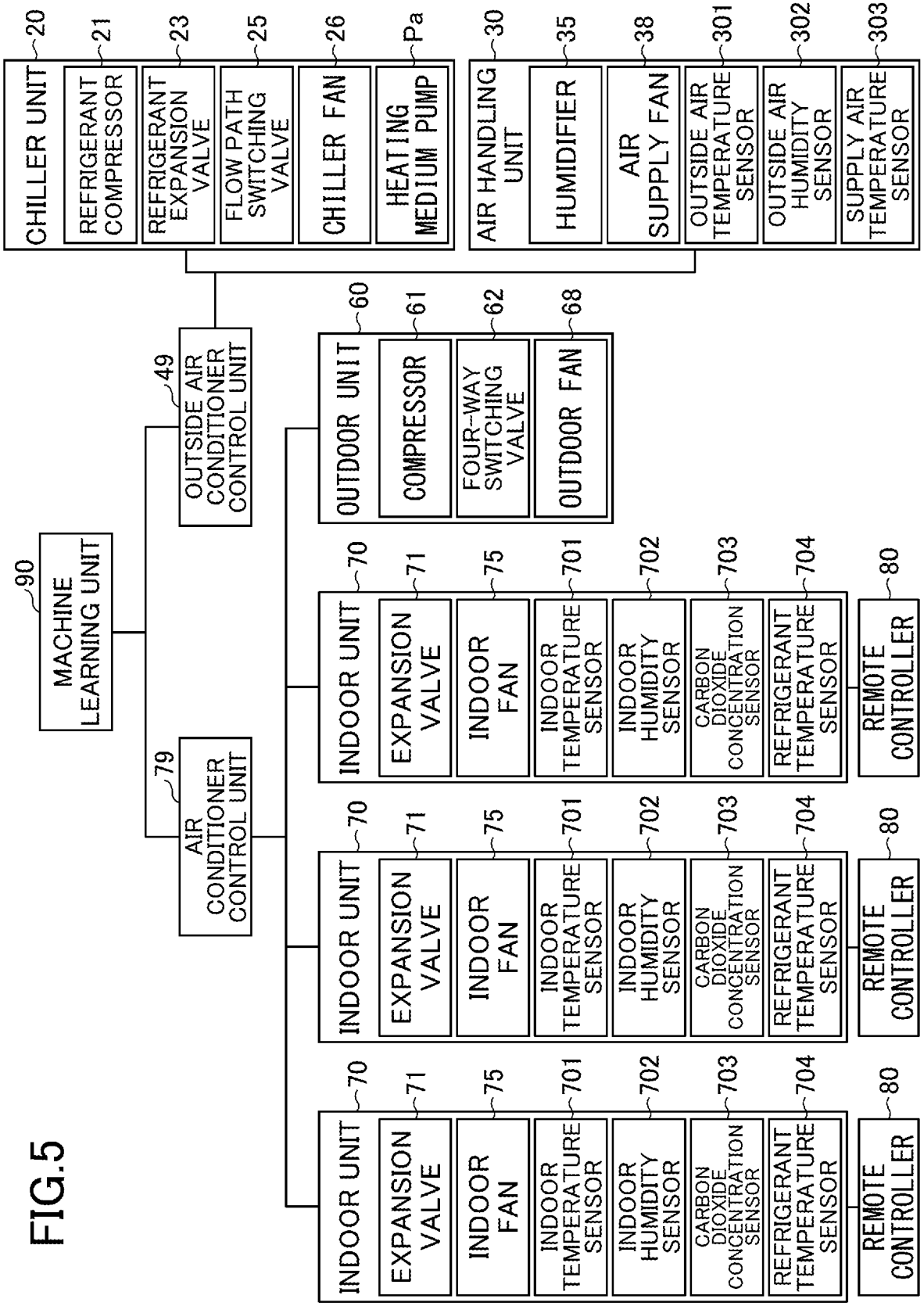
FIG. 5 is a diagram illustrating a machine learning apparatus and respective units connected to the machine learning apparatus.

First, an outline of the machine learning apparatus 90 will be described. FIG. 5 is a diagram illustrating the machine learning apparatus and the respective units connected to the machine learning apparatus. The machine learning apparatus 90 is a function unit that controls the overall operation of the air-conditioning system 100. The machine learning apparatus 90 is electrically connected to the outside air conditioner control unit 49 and the air conditioner control unit 79, for mutually transmitting and receiving signals.

The machine learning apparatus 90 controls the operating capacity of the outside air conditioner 10 and the operating capacity of the air conditioner 50 by transmitting a predetermined signal (for example, a control signal that sets the target supply air temperature Tsa or the target evaporation temperature Te) to the outside air conditioner control unit 49 and the air conditioner control unit 79. Additionally, the machine learning apparatus 90 receives predetermined signals transmitted from the outside air conditioner control unit 49 and the air conditioner control unit 79, and acquires the state variables of the outside air conditioner 10 and the air conditioner 50. Further, the machine learning apparatus 90 acquires information specifying the energy consumption of the outside air conditioner 10 and the air conditioner 50.

(2) Hardware Configuration of the Machine Learning Apparatus

Figure 6:
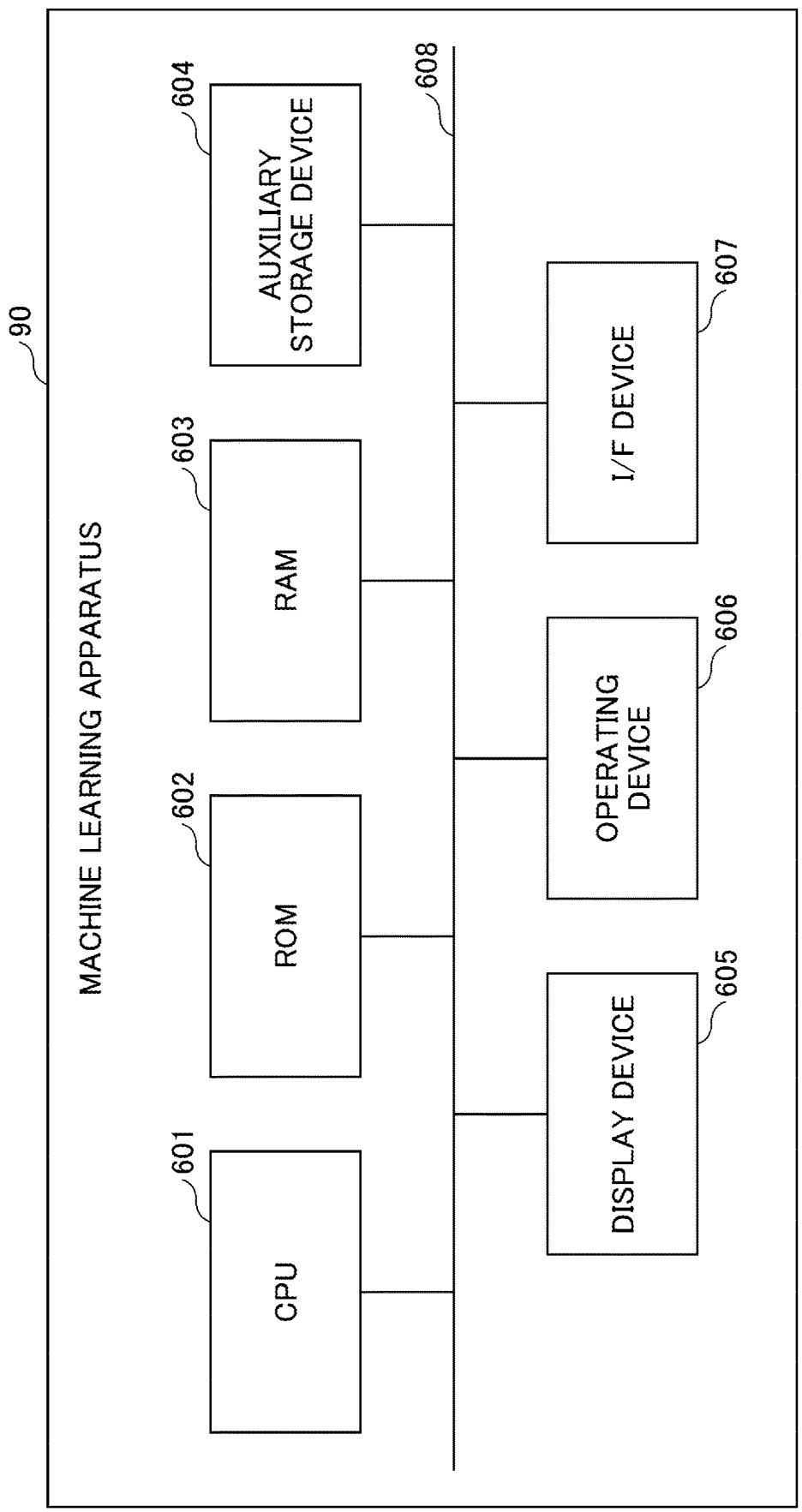
FIG. 6 is a diagram illustrating an example of a hardware configuration of the machine learning apparatus.

Next, a hardware configuration of the machine learning apparatus 90 will be described. FIG. 6 is a diagram illustrating an example of the hardware configuration of the machine learning apparatus. As illustrated in FIG. 6, the machine learning apparatus 90 includes a central processing unit (CPU) 601, a read only memory (ROM) 602, and a random access memory (RAM) 603. The CPU 601, the ROM 602, and the RAM 603 form what is called a computer. The machine learning apparatus 90 also includes an auxiliary storage device 604, a display device 605, an operating device 606, and an interface (I/F) device 607. Respective hardware components of the machine learning apparatus 90 are interconnected through a bus 608.

The CPU 601 is an arithmetic device that executes various programs installed in the auxiliary storage device 604 (for example, a machine learning program described later). The ROM 602 is a non-volatile memory. The ROM 602 functions as a main storage device and stores various programs and data necessary for the CPU 601 to execute various programs installed in the auxiliary storage device 604. Specifically, the ROM 602 stores a boot program such as a basic input/output system (BIOS) or an extensible firmware interface (EFI).

The RAM 603 is a volatile memory such as a dynamic random access memory (DRAM) or a static random access memory (SRAM). The RAM 603 functions as a main storage device and provides a workspace in which various programs are deployed when various programs installed in the auxiliary storage device 604 are executed by the CPU 601.

The auxiliary storage device 604 stores various programs and information used when various programs are executed.

The display device 605 is a display device that displays an internal state of the machine learning apparatus 90. The operating device 606 is, for example, an operating device for an administrator of the machine learning apparatus 90 to perform various operations on the machine learning apparatus 90. The I/F device 607 is a connection device that connects to the outside air conditioner control unit 49 and the air conditioner control unit 79, and transmits and receives signals, to and from the outside air conditioner control unit 49 and the air conditioner control unit 79.

(3) Functional Configuration of the Machine Learning Apparatus

Figure 7:
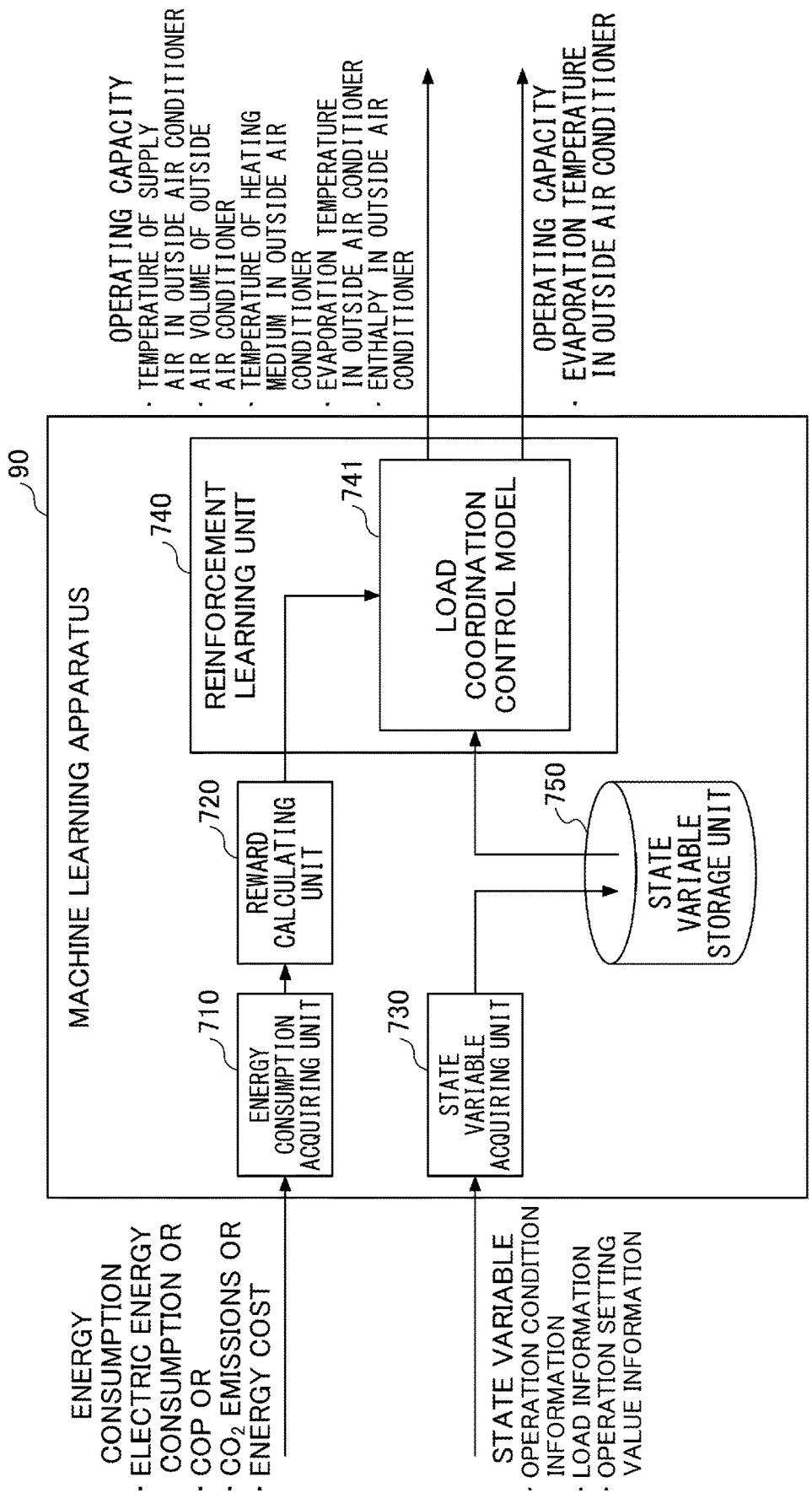
FIG. 7 is a diagram illustrating an example of a functional configuration of the machine learning apparatus.

Next, a functional configuration of the machine learning apparatus 90 will be described. FIG. 7 is a diagram illustrating an example of the functional configuration of the machine learning apparatus. As described above, the machine learning program is installed in the machine learning apparatus 90, and when the program is executed, the machine learning apparatus 90 functions as an energy consumption acquiring unit 710, a reward calculating unit 720, a state variable acquiring unit 730, and a reinforcement learning unit 740.

The energy consumption acquiring unit 710 acquires information specifying the energy consumption of the outside air conditioner 10 and the energy consumption of the air conditioner 50. Here, the information specifying the energy consumption includes the power consumption of the outside air conditioner 10 and the air conditioner 50. Additionally, the information specifying the energy consumption may include a coefficient of performance (COP). Further, the information specifying the energy consumption may include $CO_2$ emissions (carbon dioxide emissions), and energy cost (electricity and gas expense), and the like.

Further, the information specifying the energy consumption of the outside air conditioner 10 acquired by the energy consumption acquiring unit 710 includes the following.
- information specifying the energy consumption of the chiller unit 20 included in the outside air conditioner 10
- information specifying the energy consumption of the air handling unit 30 included in the outside air conditioner 10
- information specifying the energy consumption of the heating medium pump Pa included in the outside air conditioner 10

Additionally, the information specifying the energy consumption of the air conditioner 50 acquired by the energy consumption acquiring unit 710 includes the following.
- information specifying the energy consumption of the outdoor unit 60 included in the air conditioner 50
- information specifying the energy consumption of the indoor units 70 included in the air conditioner 50

The energy consumption acquiring unit 710 adds the acquired information specifying the energy consumption of the outside air conditioner 10 and acquired information specifying the energy consumption of the air conditioner 50, and notifies the reward calculating unit 720 of a total value.

The reward calculating unit 720 calculates a reward that correlates with the total value notified by the energy consumption acquiring unit 710 and notifies the reinforcement learning unit 740 of the reward.

The state variable acquiring unit 730 acquires the state variables from the outside air conditioner 10 and the air conditioner 50. The state variables acquired by the state variable acquiring unit 730 include operation condition information, load information, and operation setting value information.

The operation condition information is information indicating a condition of the outside air and a condition of the inside air when the air-conditioning system 100 operates. Specifically, the state variable acquiring unit 730 acquires the following.
- the outside air temperature or the outside air humidity as the information indicating the condition of the outside air
- the inside air temperature or the inside air humidity as information indicating the condition of the inside air The load information is information indicating an operation state of the outside air conditioner 10 and an operation state of the air conditioner 50. Specifically, the state variable acquiring unit 730 acquires the following as the information indicating the operation state of the outside air conditioner 10.
- information indicating that the outside air conditioner 10 is operating or stopped
- information indicating that the outside air conditioner 10 is in the cooling or heating mode
- the air volume of the first fan of the outside air conditioner 10
- the flow rate of the heating medium of the outside air conditioner 10
- the temperature of the heating medium of the outside air conditioner 10
- the pressure of the heating medium of the outside air conditioner 10
- a setting value of the supply air temperature of the outside air conditioner 10

The state variable acquiring unit 730 acquires the following as the information indicating the operation state of the air conditioner 50.
- information indicating that the air conditioner 50 is operating or stopped
- information indicating that the air conditioner 50 is in the cooling or heating mode
- the air volume of the second fan of the air conditioner 50
- the flow rate of the heating medium of the air conditioner 50
- the temperature of the heating medium of the air conditioner 50
- the pressure of the heating medium of the air conditioner 50
- a setting value of the evaporation temperature of the air conditioner 50

The operation setting value information is information indicating a setting value set when operating the air-conditioning system 100. Specifically, the state variable acquiring unit 730 acquires the following as the operation setting value information.
- the set indoor temperature
- the set indoor humidity The state variable acquiring unit 730 stores these state variables acquired from the outside air conditioner 10 and the air conditioner 50 in a state variable storage unit 750 in association with time information.

The reinforcement learning unit 740 is an example of a learning unit and includes a load coordination control model 741, and modifies model parameters of the load coordination control model 741 to maximize the reward notified by the reward calculating unit 720. With this modification, the reinforcement learning unit 740 performs reinforcement learning on the load coordination control model 741 that associates the state variables with at least either the operating capacity of the outside air conditioner 10 or the operating capacity of the air conditioner 50. As described, the reinforcement learning unit 740 performs the reinforcement learning on the load coordination control model 741 so as to reduce a total value obtained by adding the information specifying the energy consumption of the outside air conditioner 10 and the information specifying the energy consumption of the air conditioner 50. This allows the load coordination control model 741 to output at least either the operating capacity of the outside air conditioner 10 or the operating capacity of the air conditioner 50.

Here, the description "at least either the operating capacity of the outside air conditioner 10 or the operating capacity of the air conditioner 50" includes the following cases.

a case in which the outside air conditioner 10 and the air conditioner 50 are respectively controlled using the operating capacity of the outside air conditioner 10 and the operating capacity of the air conditioner 50 that are output from the load coordination control model 741 a case in which the outside air conditioner 10 is controlled using the operating capacity of the outside air conditioner 10 that is output from the load coordination control model 741, and the air conditioner 50 is controlled using the operating capacity derived from the operating capacity of the outside air conditioner 10 by the reinforcement learning unit 740 based on a predetermined combination a case in which the air conditioner 50 is controlled using the operating capacity of the air conditioner 50 that is output from the load coordination control model 741, and the outside air conditioner 10 is controlled using the operating capacity derived from the operating capacity of the air conditioner 50 by the reinforcement learning unit 740 based on a predetermined combination Here, the operating capacity of the outside air conditioner 10 includes the following.

the target value of the supply air temperature of the outside air conditioner 10 the target value of the air volume of the outside air conditioner 10 the target value of the temperature of the heating medium of the outside air conditioner 10 the target value of the evaporation temperature of the outside air conditioner 10 the target value of the enthalpy of the outside air conditioner 10

The operating capacity of the air conditioner 50 includes the following.

the target value of the evaporation temperature of the air conditioner

Here, it is assumed that the reward calculating unit 720 calculates the reward in accordance with a learning period of the reinforcement learning unit 740. Specifically, the reward calculating unit 720 calculates the reward based on the total value of the energy consumption that is calculated from the previous reinforcement learning to the present reinforcement learning. However, it is assumed that the learning period of the reinforcement learning unit 740 is, for example, a period determined in accordance with a time duration required until the total value of energy consumption changes after the operating capacity of the outside air conditioner 10 or the operating capacity of the air conditioner 50 has changed.

Additionally, when executing the load coordination control model 741, the reinforcement learning unit 740 reads the state variables during a time duration from the previous reinforcement learning to the present reinforcement learning, calculates an average value of the read state variables, and then inputs them into the load coordination control model 741.

The operating capacity output when the load coordination control model 741 is executed (in a case in which only one operating capacity is output, the output operating capacity and the operating capacity derived based on the output operating capacity) is transmitted to a transmission destination by the reinforcement learning unit 740. Specifically, the operating capacity of the outside air conditioner 10 is transmitted to the outside air conditioner control unit 49 by the reinforcement learning unit 740, and the operating capacity of the air conditioner 50 is transmitted to the air conditioner control unit 79 by the reinforcement learning unit 740. This causes the outside air conditioner 10 to operate to achieve the transmitted operating capacity, and the air conditioner 50 to operate to achieve the transmitted operating capacity.

(4) Details of the State Variable

Figure 8:
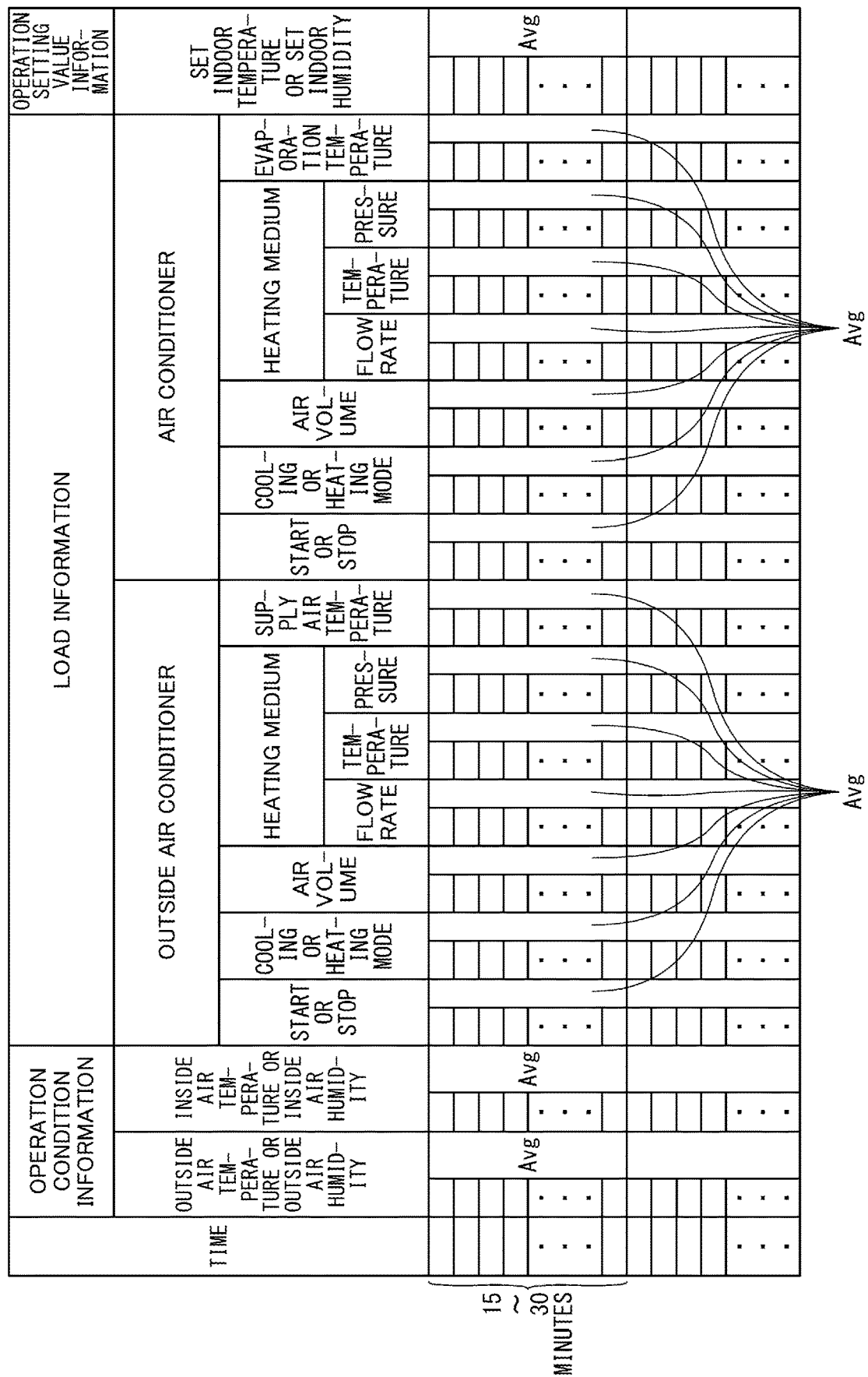
FIG. 8 is a diagram illustrating examples of a state variable stored in a state variable storage unit.

Next, the state variables stored in the state variable storage unit 750 will be described in detail. FIG. 8 is a diagram illustrating examples of the state variables stored in the state variable storage unit. As illustrated in FIG. 8, the state variables stored in the state variable storage unit 750 include "time", "operation condition information", "load information," and "operation setting value information" as items of information. Additionally, the information acquired by the state variable acquiring unit 730 is stored in "operation condition information", "load information", and "operation setting value information", for each item.

Here, the examples illustrated in FIG. 8 indicate a case in which the learning period is 15 minutes to 30 minutes, and an average value is calculated every 15 minutes to 30 minutes for each information included in "operation condition information", "load information", and "operation setting value information".

(5) Flow of the Reinforcement Learning Process

Figure 9:
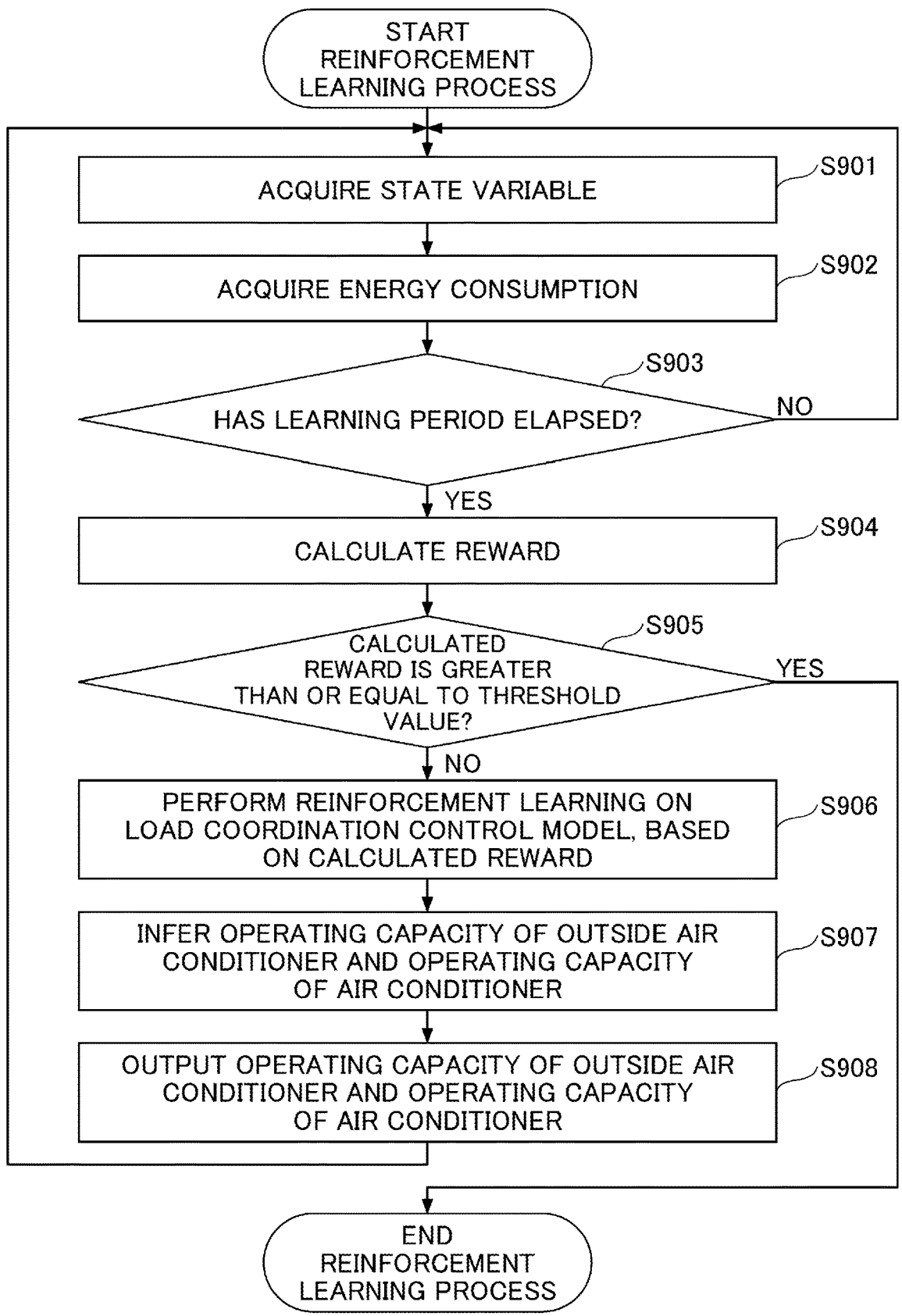
FIG. 9 is a flowchart illustrating a flow of a reinforcement learning process performed by the machine learning apparatus.

Next, a flow of a reinforcement learning process performed by the machine learning apparatus 90 will be described. FIG. 9 is a flow chart illustrating the flow of the reinforcement learning process performed by the machine learning apparatus.

In step S901, the state variable acquiring unit 730 acquires the state variables from the outside air conditioner 10 and the air conditioner 50.

In step S902, the energy consumption acquiring unit 710 adds the acquired information specifying the energy consumption of the outside air conditioner 10 and the acquired information specifying the energy consumption of the air conditioner 50 to calculate a total value.

In step S903, the reinforcement learning unit 740 determines whether a predetermined learning period has elapsed. If it is determined in step S903 that the predetermined learning period has not elapsed (NO in step S903), the process returns to step S901.

If it is determined in step S903 that the predetermined learning period has elapsed (YES in step S903), the process proceeds to step S904.

In step S904, the reward calculating unit 720 calculates the reward based on the total value accumulated during the predetermined learning period.

In step S905, the reward calculating unit 720 determines whether the calculated reward is greater than or equal to a predetermined threshold value. If it is determined in step S905 not to exceed the predetermined threshold value (NO in step S905), the process proceeds to step S906.

In step S906, the reinforcement learning unit 740 performs the reinforcement learning on the load coordination control model 741 so as to maximize the calculated reward.

In step S907, the reinforcement learning unit 740 executes the load coordination control model 741 by inputting the current state variable into the load coordination control model 741. This causes the load coordination control model 741 to output at least either the operating capacity of the outside air conditioner 10 or the operating capacity of the air conditioner 50. Here, in the reinforcement learning unit 740, if only one of the operating capacities is output by the load coordination control model 741, the other operating capacity is derived based on a predetermined combination.

In step S908, the reinforcement learning unit 740 transmits the operating capacity of the outside air conditioner 10 to the outside air conditioner control unit 49 and the output operating capacity of the air conditioner 50 to the air conditioner control unit 79. Subsequently, the process returns to step S901.

In step S905, if there is determination of being greater than or equal to the predetermined threshold value (YES in step S905), the reinforcement learning process is terminated.

SUMMARY

As can be seen from the above description, the air-conditioning system according to the first embodiment includes:

- an outside air conditioner that includes an air handling unit and a heating medium pump that adjusts a state of a heating medium flowing through the air handling unit, and that performs air conditioning of a target space by taking outside air and supplying the outside air as supply air from the air handling unit;
- an air conditioner that includes multiple indoor units and an outdoor unit that adjusts a state of refrigerant flowing through the indoor unit, and that performs air conditioning of the target space by the indoor unit cooling or heating inside air that is air in the target space and supplying the inside air to the target space; and
- a machine learning apparatus that perform learning with respect to at least either an operating capacity of the outside air conditioner or an operating capacity of the air conditioner.

Additionally, the machine learning apparatus according to the first embodiment is configured to:

- acquire state variables including a condition of the outside air, a condition of the inside air, an operation condition of the outside air conditioner, an operation condition of the air conditioner, and a set temperature or set humidity of the target space;
- perform learning by associating the state variables with at least either the operating capacity of the outside air conditioner or the operating capacity of the air conditioner;
- calculate a reward that correlates with a total of energy consumption of the outside air conditioner and energy consumption of the air conditioner; and
- use the calculated reward when performing the learning by associating the state variables with at least either the operating capacity of the outside air conditioner and the operating capacity of the air conditioner.

As described, according to the first embodiment, a load coordination control model is constructed by using actually measured data after installation of the air-conditioning system, so that a highly accurate model reflecting the characteristics of the installed device can be constructed. Additionally, according to the first embodiment, because the load coordination control model is automatically constructed by reinforcement learning, the workload after installation for starting the air-conditioning system can be reduced. Further, according to the first embodiment, the total value of the energy consumption of the outside air conditioner and the air conditioner can be reduced by setting the operating capacity of the outside air conditioner and the operating capacity of the air conditioner by using the constructed load coordination control model.

That is, according to the first embodiment, an air-conditioning system, a machine learning apparatus, and a machine learning method that optimize the operating capacity of the outside air conditioner and the operating capacity of the air conditioner can be provided.

Other Embodiments

In the above-described first embodiment, a chiller type, in which the heating medium circuit C1 and the outside air conditioner refrigerant circuit C2 are configured independently of each other as the outside air conditioner 10, is described as an example. However, the outside air conditioner 10 is not limited to a chiller type, and may not include the heating medium circuit C1, and may be of a direct expansion type in which the outside air conditioner refrigerant circuit C2 is connected to the outside air heat exchanger 33.

In the above-described first embodiment, the description assumes that if only one of the operating capacities is output by the load coordination control model 741, the reinforcement learning unit 740 derives the other operating capacity based on a predetermined combination. However, the reinforcement learning unit 740 may be configured to transmit only one operating capacity output by the load coordination control model 741. Specifically, if the operating capacity of the outside air conditioner 10 is output by the load coordination control model 741, the operating capacity may be used to control the outside air conditioner 10, and the air conditioner 50 may be changed in accordance with situation. Alternatively, if the operating capacity of the air conditioner 50 is output by the load coordination control model 741, the operating capacity may be used to control the air conditioner 50, and the outside air conditioner 10 may be changed in accordance with situation.

In the above-described first embodiment, the model (the load coordination control model) to be used when performing machine learning is not particularly described in detail, but any type of model may be applied to the model used when performing machine learning. Specifically, any type of model, such as a neural network (NN) model, a random forest model, or a support vector machine (SVM) model, is applied.

In the first embodiment, a method used when modifying the model parameters is not particularly described in detail, but a method of modifying the model parameters is determined based on the model type.

Although the embodiments have been described above, it will be understood that various modifications of form and description can be made without departing from the spirit and scope of the claims.

This application is based upon and claims priority to Japanese Patent Application No. 2019-086786, filed Apr. 26, 2019, and Japanese Patent Application No. 2020-073804, filed Apr. 17, 2020, the entire contents of which are incorporated herein by reference.

DESCRIPTION OF THE REFERENCE NUMERALS

100: air-conditioning system
10: outside air conditioner
20: chiller unit
30: air handling unit
45: air supply duct
49: outside air conditioner control unit
50: air conditioner 60: outdoor unit
70: indoor unit
79: air conditioner control unit
80: remote controller
90: machine learning apparatus
710: energy consumption acquiring unit
720: reward calculating unit
730: state variable acquiring unit
740: reinforcement learning unit
741: load coordination control model

The invention claimed is:

1. An air-conditioning system including
an outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit,
an air conditioning device that includes a plurality of indoor units and a refrigerant adjuster, and that performs air conditioning of the target space by supplying, to the target space, inside air that is cooled or heated by each of the plurality of indoor units, the refrigerant adjuster adjusting a state of refrigerant flowing through each of the plurality of indoor units, and the inside air being air in the target space, and
a machine learning apparatus that performs learning with respect to at least either an operating capacity of the outside air conditioning device or an operating capacity of the air conditioning device, the air-conditioning system comprising:
a state variable acquiring unit configured to acquire state variables including a condition of the outside air, a condition of the inside air, an operation condition of the outside air conditioning device, an operation condition of the air conditioning device, and a temperature or humidity set for the target space;
a learning unit configured to perform the learning by associating the state variables with at least either the operating capacity of the outside air conditioning device or the operating capacity of the air conditioning device; and
a reward calculating unit configured to calculate a reward that correlates with a total of energy consumption of the outside air conditioning device and energy consumption of the air conditioning device,
wherein the learning unit performs the learning by using the reward calculated in a period determined in accordance with a time duration until the total of the energy consumption changes after at least either the operating capacity of the outside air conditioning device or the operating capacity of the air conditioning device has changed.

2. The air-conditioning system as claimed in claim 1,
wherein the outside air conditioning device includes a first fan configured to take the outside air and supply the supply air to the target space and an outside air conditioner heat exchanger configured to exchange heat between the outside air taken by the first fan and the heating medium, and
wherein the operating capacity of the outside air conditioning device includes a target value of a temperature of the supply air, a target value of an air volume of the first fan, a target value of a temperature of the heating medium flowing through the outside air conditioner heat exchanger, and a target value of an evaporation temperature or enthalpy of the heating medium in the outside air conditioner heat exchanger.

3. The air-conditioning system as claimed in claim 2,
wherein each of the plurality of indoor units of the air conditioning device includes a second fan that takes the inside air and supplies the inside air to the target space, and an air conditioning heat exchanger configured to exchange heat between the inside air taken by the second fan and the refrigerant, and
wherein the operating capacity of the air conditioning device includes a target value of an evaporation temperature in the air conditioning device.

4. The air-conditioning system as claimed in claim 3,
wherein the condition of the outside air includes a temperature of the outside air or a humidity of the outside air,
wherein the condition of the inside air includes a temperature of the inside air or a humidity of the inside air,
wherein the operation condition of the outside air conditioning device includes any of information indicating that the outside air conditioning device is operating or stopped, information indicating that the outside air conditioning device is in a cooling mode or a heating mode, the air volume of the first fan of the outside air conditioning device, a flow rate of the heating medium, the temperature of the heating medium, a pressure of the heating medium, and a setting value of the temperature of the supply air, and
wherein the operation condition of the air conditioning device includes any of information indicating that the air conditioning device is operating or stopped, information indicating that the air conditioning device is in a cooling mode or a heating mode, an air volume of the second fan of the air conditioning device, a flow rate of the refrigerant, a temperature of the refrigerant, a pressure of the refrigerant, and a setting value of the evaporation temperature in the air conditioning device.

5. The air-conditioning system as claimed in claim 1,
wherein the energy consumption of the outside air conditioning device includes respective energy consumption of a chiller unit, the heating medium adjuster, and the outside air conditioning unit included in the outside air conditioning device, and
wherein the energy consumption of the air conditioning device includes respective energy consumption of the plurality of indoor units and the refrigerant adjuster.

6. The air-conditioning system as claimed in claim 5, wherein the energy consumption includes any of power consumption, carbon dioxide emissions, and energy cost.

7. A machine learning apparatus that performs learning with respect to at least either operating capacity of an outside air conditioning device or operating capacity of an air conditioning device in an air-conditioning system including
the outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit, and
the air conditioning device that includes a plurality of indoor units and a refrigerant adjuster, and that performs air conditioning of the target space by supplying, to the target space, inside air that is cooled or heated by each of the plurality of indoor units, the refrigerant adjuster adjusting a state of refrigerant flowing through each of the plurality of indoor units, and the inside air being air in the target space, the machine learning apparatus comprising:

a state variable acquiring unit configured to acquire state variables including a condition of the outside air, a condition of the inside air, an operation condition of the outside air conditioning device, an operation condition of the air conditioning device, and a temperature or humidity set for the target space;

a learning unit configured to perform the learning by associating the state variables with at least either the operating capacity of the outside air conditioning device or the operating capacity of the air conditioning device; and a reward calculating unit configured to calculate a reward that correlates with a total of energy consumption of the outside air conditioning device and energy consumption of the air conditioning device, wherein the learning unit performs the learning by using the reward calculated in a period determined in accordance with a time duration until the total of the energy consumption changes after at least either the operating capacity of the outside air conditioning device or the operating capacity of the air conditioning device has changed.

8. A machine learning method that performs learning with respect to at least either operating capacity of an outside air conditioning device or operating capacity of an air conditioning device in an air-conditioning system including the outside air conditioning device that includes an outside air conditioning unit and a heating medium adjuster, and that performs air conditioning of a target space by taking outside air and supplying the outside air as supply air from the outside air conditioning unit, the heating medium adjuster adjusting a state of a heating medium flowing through the outside air conditioning unit, and the air conditioning device that includes a plurality of indoor units and a refrigerant adjuster, and that performs air conditioning of the target space by supplying, to the target space, inside air that is cooled or heated by each of the plurality of indoor units, the refrigerant adjuster adjusting a state of refrigerant flowing through each of the plurality of indoor units, and the inside air being air in the target space, the machine learning method comprising:

a state variable acquiring step of acquiring state variables including a condition of the outside air, a condition of the inside air, an operation condition of the outside air conditioning device, an operation condition of the air conditioning device, and a temperature or humidity set for the target space;

a learning step of performing the learning by associating the state variables with at least either the operating capacity of the outside air conditioning device or the operating capacity of the air conditioning device; and a reward calculating step of calculating a reward that correlates with a total of energy consumption of the outside air conditioning device and energy consumption of the air conditioning device, wherein the learning step performs the learning by using the reward calculated in a period determined in accordance with a time duration until the total of the energy consumption changes after at least either the operating capacity of the outside air conditioning device or the operating capacity of the air conditioning device has changed.

* * * * *